United States Patent
Agarwal et al.

(10) Patent No.: US 8,207,822 B2
(45) Date of Patent: *Jun. 26, 2012

(54) SUPPORT FOR BATCHING OF EVENTS, AND SHREDDING OF BATCHED EVENTS IN THE RFID INFRASTRUCTURE PLATFORM

(75) Inventors: Abhishek Agarwal, Hyderabad (IN); Anush Kumar, Seattle, WA (US); Balasubramanian Sriram, Sammamish, WA (US); Mohamed Fakrudeen Ali Ahmed, Coimbatore (IN); Janaki Ram Goteti, Hyderabad (IN); Jayaram Kalyana Sundaram, Hyderbad (IN); Kalyan Chakravarthy Sonnathi, Hyderabad (IN); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1166 days.

This patent is subject to a terminal disclaimer.

(21) Appl. No.: 11/460,796

(22) Filed: Jul. 28, 2006

(65) Prior Publication Data

US 2008/0001710 A1 Jan. 3, 2008

(30) Foreign Application Priority Data

Jun. 15, 2006 (IN) .......................... 1425/DEL/2006

(51) Int. Cl.
*H04Q 5/22* (2006.01)
(52) U.S. Cl. ................ 340/10.1; 340/572.1; 340/10.32; 235/376; 709/201
(58) Field of Classification Search ................ 340/10.1, 340/572.1; 709/201, 249, 250; 235/376
See application file for complete search history.

(56) References Cited

U.S. PATENT DOCUMENTS

| | | | |
|---|---|---|---|
| 5,650,768 A | 7/1997 | Eswaran | |
| 5,682,529 A | 10/1997 | Hendry et al. | |
| 5,910,776 A | 6/1999 | Black | |
| 6,108,712 A | 8/2000 | Hayes | |
| 6,405,261 B1 | 6/2002 | Gaucher | |
| 6,631,363 B1 | 10/2003 | Brown et al. | |
| 6,677,852 B1 | 1/2004 | Landt | |
| 6,732,923 B2 | 5/2004 | Otto | |
| 6,784,802 B1 | 8/2004 | Stanescu | |
| 6,859,831 B1 | 2/2005 | Gelvin et al. | |
| 6,862,735 B1 | 3/2005 | Slaughter et al. | |
| 6,908,034 B2 | 6/2005 | Alleshouse | |
| 6,920,330 B2 | 7/2005 | Caronni et al. | |
| 6,943,683 B2 | 9/2005 | Perret | |
| 7,005,985 B1 | 2/2006 | Steeves | |
| 7,155,305 B2 | 12/2006 | Hayes et al. | |

(Continued)

FOREIGN PATENT DOCUMENTS

EP 11632893 3/2006

(Continued)

OTHER PUBLICATIONS

Floerkemier, et al. "PML Core Specification 1.0" Sep. 13, 2003, Auto-ID Center, Version 1.0, 48 pages.

(Continued)

*Primary Examiner* — Brian Zimmerman
*Assistant Examiner* — Omer S Khan

(57) ABSTRACT

The claimed subject matter provides a system and/or a method that facilitates receiving data from at least one device. A radio frequency identification (RFID) network can include at least one device that receives data from a tag. A batcher component can collect the data based on a start boundary and an end boundary and communicate the batched data to an RFID process.

20 Claims, 12 Drawing Sheets

U.S. PATENT DOCUMENTS

| | | | |
|---|---|---|---|
| 7,204,409 | B2 | 4/2007 | Kumar et al. |
| 7,267,275 | B2 | 9/2007 | Cox et al. |
| 7,295,116 | B2 | 11/2007 | Kumar et al. |
| 7,382,260 | B2 | 6/2008 | Agarwal et al. |
| 7,484,664 | B2 | 2/2009 | Shafer |
| 7,526,545 | B2 | 4/2009 | Jerome |
| 7,619,521 | B2 | 11/2009 | Williams et al. |
| 2002/0054080 | A1 | 5/2002 | Belanger et al. |
| 2002/0059471 | A1 | 5/2002 | Savghvi et al. |
| 2002/0070865 | A1 | 6/2002 | Lancos et al. |
| 2002/0103819 | A1 | 8/2002 | Duvillier et al. |
| 2002/0140966 | A1 | 10/2002 | Meade et al. |
| 2002/0170952 | A1 | 11/2002 | Alsafadi et al. |
| 2002/0188934 | A1 | 12/2002 | Griffioen et al. |
| 2003/0041127 | A1 | 2/2003 | Tumbull et al. |
| 2003/0135576 | A1 | 7/2003 | Bodin |
| 2003/0144926 | A1 | 7/2003 | Bodin et al. |
| 2003/0167238 | A1* | 9/2003 | Zeif .............................. 705/400 |
| 2003/0204711 | A1 | 10/2003 | Guess |
| 2003/0210821 | A1* | 11/2003 | Yogeshwar et al. .......... 382/232 |
| 2003/0225928 | A1 | 12/2003 | Paul |
| 2003/0227392 | A1 | 12/2003 | Ebert et al. |
| 2004/0024658 | A1 | 2/2004 | Carbone et al. |
| 2004/0046642 | A1 | 3/2004 | Becker et al. |
| 2004/0070491 | A1 | 4/2004 | Huang et al. |
| 2004/0103139 | A1 | 5/2004 | Hubbard et al. |
| 2004/0111335 | A1 | 6/2004 | Black et al. |
| 2004/0139200 | A1 | 7/2004 | Rossi et al. |
| 2004/0193449 | A1 | 9/2004 | Wildman et al. |
| 2004/0193641 | A1 | 9/2004 | Lin |
| 2004/0215667 | A1 | 10/2004 | Taylor et al. |
| 2004/0230963 | A1 | 11/2004 | Rothman et al. |
| 2004/0255291 | A1 | 12/2004 | Sierer et al. |
| 2005/0035860 | A1* | 2/2005 | Taylor et al. ............... 340/572.1 |
| 2005/0062603 | A1 | 3/2005 | Fuerst et al. |
| 2005/0088420 | A1 | 4/2005 | Dodge et al. |
| 2005/0092825 | A1* | 5/2005 | Cox et al. ...................... 235/375 |
| 2005/0144612 | A1 | 6/2005 | Wang et al. |
| 2005/0150952 | A1 | 7/2005 | Chung |
| 2005/0150953 | A1 | 7/2005 | Alleshouse |
| 2005/0189444 | A1* | 9/2005 | Kost .............................. 239/661 |
| 2005/0198228 | A1 | 9/2005 | Bajwa et al. |
| 2005/0237194 | A1 | 10/2005 | VoBa |
| 2005/0257215 | A1 | 11/2005 | Denby et al. |
| 2005/0262189 | A1 | 11/2005 | Mamou et al. |
| 2006/0022800 | A1* | 2/2006 | Krishna et al. ............... 340/10.2 |
| 2006/0026080 | A1 | 2/2006 | Rodriguez et al. |
| 2006/0043165 | A1 | 3/2006 | Kumar et al. |
| 2006/0044111 | A1 | 3/2006 | Kollar et al. |
| 2006/0047464 | A1 | 3/2006 | Kumar et al. |
| 2006/0047545 | A1 | 3/2006 | Kumar et al. |
| 2006/0047646 | A1 | 3/2006 | Maluf et al. |
| 2006/0047787 | A1 | 3/2006 | Agarwal et al. |
| 2006/0047789 | A1 | 3/2006 | Kumar et al. |
| 2006/0053234 | A1 | 3/2006 | Kumar et al. |
| 2006/0055508 | A1 | 3/2006 | Kumar et al. |
| 2006/0055564 | A1* | 3/2006 | Olsen et al. ................... 340/994 |
| 2006/0058987 | A1 | 3/2006 | Kumar et al. |
| 2006/0075210 | A1 | 4/2006 | Manohar et al. |
| 2006/0080074 | A1 | 4/2006 | Williams et al. |
| 2006/0108411 | A1 | 5/2006 | Macurek et al. |
| 2006/0136710 | A1 | 6/2006 | Oka et al. |
| 2006/0143439 | A1 | 6/2006 | Arumugam et al. |
| 2006/0174242 | A1 | 8/2006 | Zhu |
| 2006/0176169 | A1 | 8/2006 | Doolin et al. |
| 2006/0202825 | A1 | 9/2006 | Rajapakse et al. |
| 2006/0214794 | A1* | 9/2006 | Wang .......................... 340/572.1 |
| 2006/0226981 | A1 | 10/2006 | Gregersen et al. |
| 2007/0024463 | A1 | 2/2007 | Hall et al. |
| 2007/0027964 | A1 | 2/2007 | Herrod |
| 2007/0033585 | A1 | 2/2007 | Fukui |
| 2007/0035396 | A1 | 2/2007 | Chand |
| 2007/0044092 | A1 | 2/2007 | Banerjee |
| 2007/0046467 | A1 | 3/2007 | Chakraborty et al. |
| 2007/0050236 | A1 | 3/2007 | Esposito-Ross et al. |
| 2007/0109100 | A1 | 5/2007 | Jett et al. |
| 2007/0136278 | A1 | 6/2007 | Grazioli et al. |
| 2007/0207792 | A1 | 9/2007 | Loving |
| 2007/0250830 | A1 | 10/2007 | Holmberg et al. |
| 2008/0163173 | A1 | 7/2008 | Bauer et al. |
| 2008/0288625 | A1 | 11/2008 | Agarwal et al. |
| 2009/0019061 | A1 | 1/2009 | Scanneli |
| 2009/0037899 | A1 | 2/2009 | Dharap et al. |
| 2010/0005175 | A1 | 1/2010 | Swildens et al. |
| 2010/0030768 | A1 | 2/2010 | Poblete et al. |
| 2010/0211515 | A1 | 8/2010 | Woodings et al. |
| 2010/0257099 | A1 | 10/2010 | Bonalle et al. |
| 2010/0262923 | A1 | 10/2010 | Citrin et al. |

FOREIGN PATENT DOCUMENTS

| | | |
|---|---|---|
| GB | 2372894 | 10/2002 |
| WO | 03102845 | 12/2003 |
| WO | 2005078633 | 8/2005 |

OTHER PUBLICATIONS

European Search Report dated Feb. 6, 2006, mailed Feb. 6, 2006 for EP Appln. Serial No. 05107826, 7 pages.

European Search Report dated Oct. 4, 2005, mailed Apr. 11, 2006 for EP Appln. Serial No. 05108005, 9 pages.

European Search Report dated Oct. 2, 2005, mailed Feb. 10, 2006 for EP Appln. Serial No. 05107796, 6 pages.

IBM."alphaWorks: RFID Device Development Kit: Overview" http://www/alphaworks.ibm.com/tech/rfiddevice last viewed Nov. 7, 2005, 1 page.

Alien "ALR-9800 Enterprise RFID Reader" http://www.alientechnology.com/docs/AT_DS_9800v3_WEB.pdf last viewed Nov. 7, 2005, 4 pages.

Tsetsos, et al. "Commercial Wireless Sensor Networks: Technical and Business Issues" Proceedings of the Second Annual Conference on Wireless On-Demand Network Systems and Services (Jan. 19-21, 2005) 8 pages.

Branch, et al. "Sentire: A Framework for Building Middleware for Sensor and Actuator Networks" Proceedings of the Third International Conference on Pervasive Computing and Communications Workshops (Mar. 8, 2005) pp. 396-400.

Harrison, et al. "Information Management in the Product Lifecycle—the Role Networked RFID" Proceedings of the Second IEEE International Conference (Jun. 24, 2004) pp. 507-512.

Bornhovd, et al. "Integrating Smart Items with Business Processes an Experience Report" Proceedings of the Thirty-Eighth Hawaii International Conference on System Science (Jan. 3, 2005) 8 pages.

Ganesh, et al. "Web Services and Multi-Channel Integration: A Proposed Framework" Proceedings of the IEEE International Conference on Web Services (Jul. 6, 2004) 8 pages.

Ortiz. "An Introduction to Java Card Technology—Part1" http://developers.sun.com/techtopics/mobility/javacard/articles/javacard1/> last viewed Dec. 19, 2005, 14 pages.

Chen. "Understanding Java Card 2.0" URL:.com//javaworld/jw-03-javadev_p.html> last viewed Dec. 19, 2005, 12 pages.

Annonymous. "The Sun Global RFID Network Vision: Connecting Business at the Edge of Network" http://www.sun.com/software/solutions/rfid/Sun_RFIS_Vision_rla.pdf Jul. 2004.

European Search Report dated Mar. 9, 2006, mailed Mar. 27, 2006 for European Patent Application No. EP05107794, 5 pages.

European Search Report dated Feb. 7, 2006, mailed Feb. 7, 2006 for European Patent Application No. EP05108001, 7 pages.

European Search Report dated May 11, 2006, mailed May 12, 2006 for European Patent Application No. EP05107744, 7 pages.

International Search Report dated and mailed Jul. 27, 2007 for PCT Application Serial No. PCT 2007/004005, 6 pages.

The Business Value of Radio Frequency Identification (RFID)* (2006) Microsoft Corporation, 21 pages.

Universal Serial Bus Device Class Specification for Device Firmware Upgrade (1999) USB Device Firmware Upgrade Specification, Revision 1.0, 44 pages.

OA dated Dec. 9, 2010 for U.S. Appl. No. 11/626,968, 20 pages.

OA dated May 25, 2011 for U.S. Appl. No. 11/626,968, 19 pages.

Notice of Allowance dated Feb. 13, 2008 for U.S. Appl. No. 11/325,181, 32 pages.

OA dated Apr. 23, 2010 for U.S. Appl. No. 11/460,772, 41 pages.

Notice of Allowance dated Feb. 10, 2011 for U.S. Appl. No. 11/460,772, 21 pages.

OA dated Jun. 11, 2009 for U.S. Appl. No. 11/460,830, 35 pages.

Notice of Allowance dated Dec. 3, 2009 for U.S. Appl. No. 11/460,830, 8 pages.

"BEA WebLogic RFID Enterprise Server Rock-solid Foundation for Centralized Data and Infrastructure Management for Enterprise-Scale RFID Deployments" (2006) BEA Systems, Inc. Product Data Sheet, 8 pages.

Tsuji et al. "Asset Management Solution Based RFID" (2004) NEC of Advanced Technologies vol. 1 No. 3, pp. 188-193.

Bawa, et al., Real-Time Inventory Using RFIS: (2004) Group Four, 39 pages.

OA dated Apr. 5, 2010 for U.S. Appl. No. 11/625,862, 10 pages.

OA dated Apr. 5, 2010 for U.S. Appl. No. 12/125,947, 27 pages.

OA dated Sep. 17, 2010 for U.S. Appl. No. 12/125,947, 21 pages.

OA dated Aug. 12, 2011 for U.S. Appl. No. 11/460,796, 33 pages.

* cited by examiner

SUPPORT FOR BATCHING OF EVENTS, AND SHREDDING OF BATCHED EVENTS IN THE RFID INFRASTRUCTURE PLATFORM

CROSS REFERENCE TO RELATED APPLICATION(S)

This application claims the benefit of India Patent Application Serial No. 1425/DEL/2006 filed on Jun. 15, 2006, entitled "SUPPORT FOR BATCHING OF EVENTS, AND SHREDDING OF BATCHED EVENTS IN THE RFID INFRASTRUCTURE PLATFORM." The entirety of which application is incorporated herein by reference.

BACKGROUND

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g. more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g. distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g. tag transceivers), tag writers, tag-programming stations, circulation readers, sorting equipment, tag inventory wands, etc. Such RFID systems can collect and/or accumulate an immense amount of data, wherein utilizing such massive amounts of data can be time-consuming, inefficient, redundant, and/or costly.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate utilizing wirelessly communicated data from a device within an RFID network in connection with a process. A batcher component can collect data from a device within an RFID network based at least in part upon a cycle and/or a start boundary and an end boundary. The collected data (also referred to as batched data) can be routed and/or communicated to an RFID process. The data can be any data communicated from a tag to a device within the physical RFID network. The batcher component allows the receipt of data (e.g. tag read, tag read event, etc.) in a batch manner rather than continuously receiving such reads and/or events. In other words, the batcher component optimizes processor and/or resources by providing data in batch rather than providing such data in a continuous technique. It is to be appreciated that the batching can be done via intelligent primitives that can be specified over the flavor of data a particular process needs. In one instance, the batcher component can implement predictive batching of event streams based at least in part upon how such event streams are processed in an event processing pipeline over a duration of time (e.g., a self-corrective batching technique). The RFID process can utilize the batched data for processing within the pipeline allowing various components (e.g., event handlers, filters, transforms, aggregations, managed code running in the context of the RFID process, etc.) to implement such data as necessary. The device that receives data from a tag within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system.

Furthermore, the batcher component can ascertain a batching primitive associated with an event processing pipeline related to the RFID process in order to receive relevant batched data (e.g., tag reads, reads, events, etc.). Thus, the batcher component can examine the event processing pipeline to determine batching primitives and apply such primitives to receive relevant batched reads. The claimed subject matter can further implement a declarative design construct (e.g., an extensible markup language (XML) file), allowing the specification of a particular batching primitive for an event processing pipeline. In other words, at design time, a user can specify particular batch characteristics which can be related to the event processing pipeline and utilized by the batcher component to ascertain batched data. Furthermore, the batcher component allows the declarative batcher specification and/or batching primitives to be pushed directly to the device and/or execute it on a server side based on device capabilities.

The batcher component can utilize a boundary condition (e.g., a start boundary, an end boundary, a cycle, etc.) to determine and/or ascertain batched data. It is to be understood that a cycle can be, for instance, a unit of time, a time, a pre-determined number of reads, a pre-determined number of tag events, a pre-determined number of tag read events, and the like. Moreover, the start boundary and/or the end boundary can be based on a unit of time, a time, an amount of data capacity, a pre-determined amount of data, a pre-determined number of reads, a pre-determined number of tag events, a pre-determined number of tag read events, and the like. Once the data is collected by the batcher component, such batched data can be routed and/or communicated to the RFID process or more than one RFID process that can utilize such data. The RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, etc.

In accordance with one aspect of the claimed subject matter, the batcher component can route the batched data to the RFID process, wherein the RFID process can provide at least one of the following: a filter; an aggregate; and/or a transform (also referred to as "FAT"). For example, the FAT can be defined and/or provided at design time, wherein a process can be created allowing the component to utilize the FAT. Once the process is deployed, the devices can be bound to the process such that the process can receive the collected data based on the boundary conditions, wherein the batched data is utilized by the process and the FAT is employed therewith. Furthermore, in accordance with another aspect of the claimed subject matter, the batcher component can execute a query to provide the triggering of the batch data to be routed and/or communicated. In other aspects of the claimed subject matter, methods are provided that facilitate providing wirelessly communicated data to a process in a batch form.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
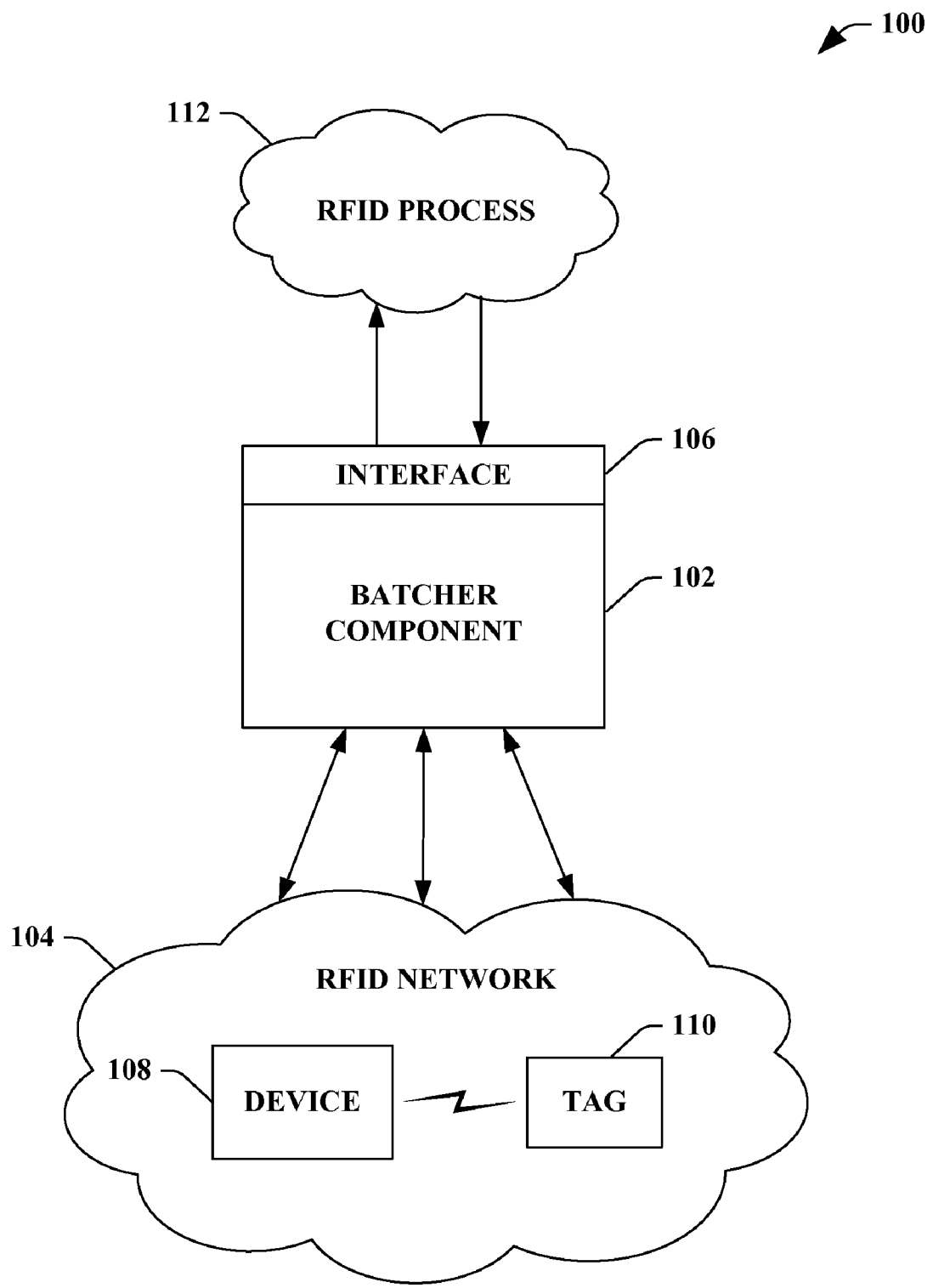
FIG. 1 illustrates a block diagram of an exemplary system that facilitates utilizing wirelessly communicated data from a device within an RFID network in connection with a process.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "manager," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates utilizing wirelessly communicated data from a device within an RFID network in connection with a process. The system can include a batcher component 102 that can employ a start boundary and an end boundary to ascertain data from a device 108 within the start boundary and end boundary received within an RFID network 108 from a tag 110. The batcher component 102 allows the receipt of data (e.g., tag read, tag read event, etc.) in a batch manner rather than continuously receiving such reads and/or events. In other words, the batcher component 102 optimizes processor and/or resources by providing data in batch rather than providing such data in a continuous technique. The batcher component 102 can collect the reads, tag reads, and/or tag read events within a cycle defined by the start boundary and the end boundary, wherein the batcher can provide an RFID process 112 with such batched data via an interface 106 (discussed infra). The RFID process 112 can utilize the batched data for processing within the pipeline allowing various components (e.g., event handlers, filters, transforms, aggregations, managed code running in the context of the RFID process 112, etc.) to implement such data as necessary. It is to be appreciated that the batching can be done via intelligent primitives that can be specified over the flavor of data a particular process needs. In one instance, the batcher component can implement predictive batching of event streams based at least in part upon how such event streams are processed in an event processing pipeline over a duration of time (e.g., a self-corrective batching technique).

Moreover, the batcher component 102 can ascertain a batching primitive associated with an event processing pipeline related to the RFID process 112 in order to receive relevant batched data (e.g., tag reads, reads, events, etc.). Thus, the batcher component 102 can examine the event processing pipeline to determine batching primitives and apply such primitives to receive relevant batched reads. The claimed subject matter can further implement a declarative design construct (e.g., an extensible markup language (XML) file), allowing the specification of a particular batching primitive for an event processing pipeline. In other words, at design time, a user can specify particular batch characteristics which can be related to the event processing pipeline and utilized by the batcher component 102 to ascertain batched data. Furthermore, the batcher component 102 allows the declarative batcher specification and/or batching primitives to be pushed directly to the device 108 and/or execute it on a server side based on device capabilities (e.g. such as the RFID network 104).

Furthermore, the batcher component 102 can collect the batched events, reads, tag read events in accordance with the start boundary and the end boundary and communicate such data to the RFID process 112. The RFID process 112 can then provide at least one of the following: a filter; an aggregate; and/or a transform (each of which are discussed infra also referred to as "FAT"). For example, the FAT can be defined and/or provided at design time, wherein a process can be created allowing the component (e.g., an event handler) to utilize the FAT. Once the process is deployed, the devices can be bound to the process such that the process can receive the collected reads, tag reads, tag read events, based on the boundaries, wherein the batched data is utilized by the process and the FAT is employed therewith. Moreover, the batcher component 102 can collect the data from the device 108 and route such data to, for example, a dedicated queue (not shown) for the RFID process 112. In addition, the batcher component 102 can execute a query (e.g., sequential query language (SQL)) to provide the triggering of the batch data to be routed and/or communicated.

It is to be appreciated that the device 108 within the RFID network 104 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 within the RFID network 104 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100.

In one example, the RFID network 104 can include at least one device 108 that is associated with at least one RFID process 112. It is to be appreciated that the RFID process 112 can utilize any suitable number of devices 108 within the RFID network 104. An RFID process 112 can be related to a particular RFID sub-system (e.g., an RFID server, RFID network, etc.) that is an uber or high-level object that forms together various entities to create a meaningful unit of execution. The RFID process 112 can be and/or can include an outbound process (e.g., pick, pack, shipping scenario, etc.), a manufacturing process, a shipping process, a receiving process, tracking, data representation, data manipulation, data application, security, etc. Additionally, the RFID process 112 can include and/or respond to a device service, a tag read, an event, a tag write, a device configuration, a geographic tracking, a number count, etc. It is to be appreciated that the process can have raw data collected via at least one device associated with the RFID network 104, wherein such raw data can be manipulated based at least in part upon a rule and/or a business rule engine (not shown).

Moreover, the system 100 can include any suitable and/or necessary interface component 106 (herein referred to as "interface 106"), which provides various adapters, connectors, channels, communication paths, etc. to integrate the batcher component 102 into virtually any operating and/or database system(s). In addition, the interface 106 can provide various adapters, connectors, channels, communication paths, etc., that provide for interaction with the batcher component 102, the RFID network 104, the RFID process 112 and any other device and/or component associated with the system 100.

Figure 2:
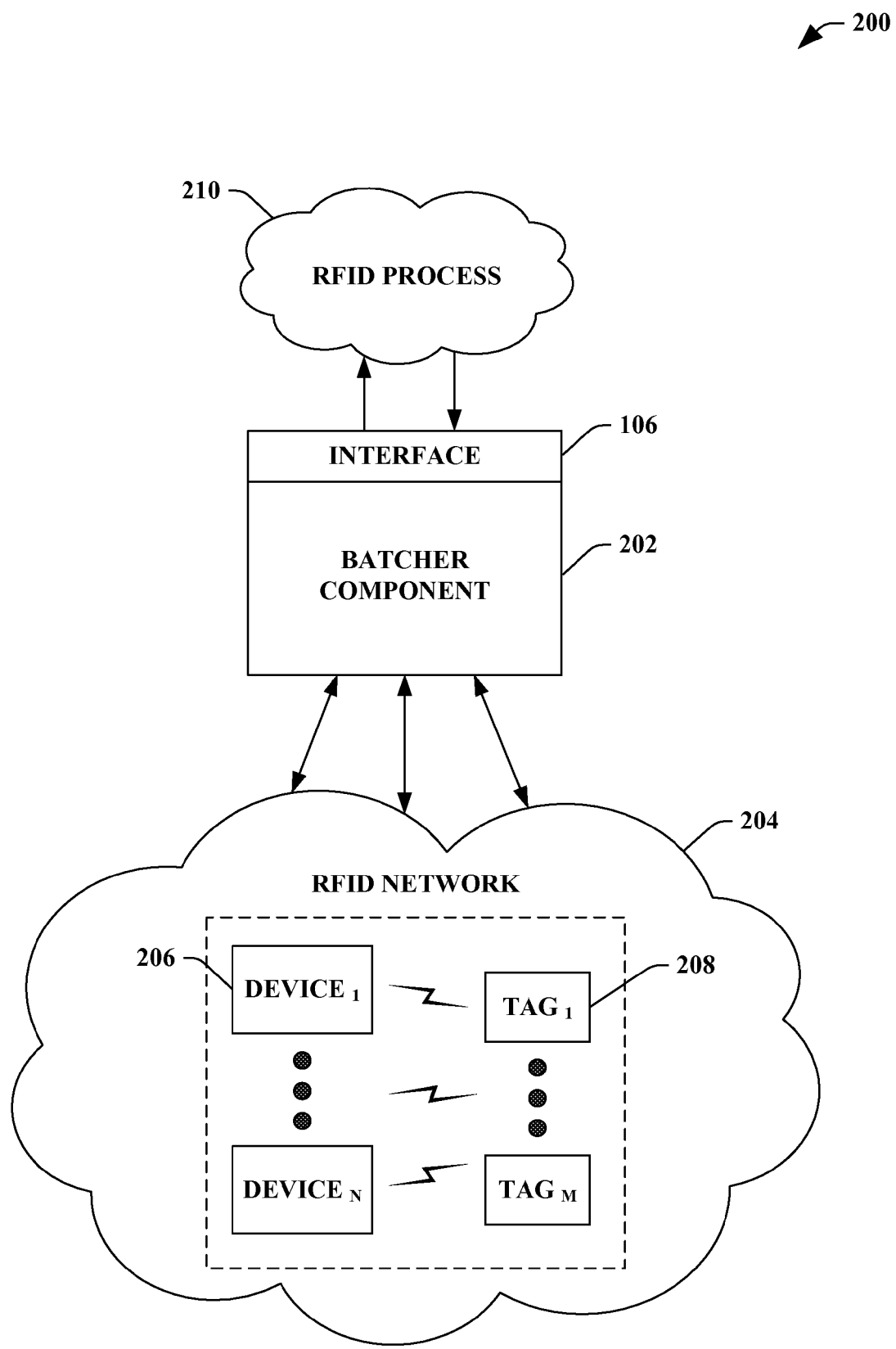
FIG. 2 illustrates a block diagram of an exemplary system that facilitates providing an RFID process with data in utilizing a first boundary condition and a second boundary condition.

FIG. 2 illustrates a system 200 that facilitates providing an RFID process with data in utilizing a first boundary condition and a second boundary condition. The system 200 can include a batcher component 202 that collects data from at least one device 206 within an RFID network 204, wherein such data collection can be associated with a cycle. The cycle can include a start boundary and an end boundary, wherein data can be collected accordingly. For example, the cycle can be a unit of time, a pre-determined number of reads, tag events, tag read events, and the like. Upon completion of the cycle, the batcher component 202 can provide the data to the RFID process to optimize processing time, resources, and the like. It is to be understood that the batcher component 202, the RFID network 204, the RFID process 210, the device 206, and the tag 208 can be substantially similar to the batcher component 102, the RFID network 104, the RFID process 112, the device 108, and the tag 110 depicted in FIG. 1.

Moreover, the batcher component 202 can ascertain a batching primitive associated with an event processing pipeline related to the RFID process 210 in order to receive relevant batched data (e.g., tag reads, reads, events, etc.). Thus, the batcher component 202 can examine the event processing pipeline to determine batching primitives and apply such primitives to receive relevant batched reads. The claimed subject matter can further implement a declarative design construct (e.g., an extensible markup language (XML) file), allowing the specification of a particular batching primitive for an event processing pipeline. In other words, at design time, a user can specify particular batch characteristics which can be related to the event processing pipeline and utilized by the batcher component 202 to ascertain batched data. Furthermore, the batcher component 202 allows the declarative batcher specification and/or batching primitives to be pushed directly to the device 206 and/or execute it on a server side based on device capabilities (e.g. such as the RFID network 204).

The RFID network 204 can be implemented by any enterprise, business, facility, and/or any suitable entity that can utilize RFID technology. For instance, the RFID network 204 can be deployed to include any number of devices 206 such as $device_1$ to $device_N$, where N is positive integer. Moreover, such devices 206 can interact (e.g., wirelessly communicate) with any number of tags 208 such as $tag_1$ to $tag_M$, where M is a positive integer to provide an event, a tag read event, a tag read, etc. It is to be appreciated that the devices 206 can be at least one of the following: an RFID reader, an RFID writer, an RFID printer, an RFID transmitter, a sensor, a real-time device, an RFID receiver, a real-time sensor, a device extensible to a web service, a real-time event generator, etc. In addition, the device 206 can be associated with at least an antenna to communicate data. Furthermore, it is to be appreciated that the tags 208 can be associated to any suitable object related to the enterprise, business, facility, and/or any suitable entity utilizing such RFID technology.

The devices 206 can be associated with at least one RFID process 210. It is to be appreciated that the RFID process 210 can run in the same host as a server (not shown), the batcher component 202, and/or any combination thereof. Although only a single RFID process is depicted, it is to be appreciated that a plurality of RFID processes can be executed in conjunction with the RFID network 204. The RFID network 204 can include various sub-systems and/or groups based at least in part upon device location, device functionality, device security level, process device association, make and/or model of device, type of device, device frequency, etc. For example, an RFID network 204 can include two groups and/or collections of devices, one at a shipping door and another at a receiving door. Such RFID network 204 can further include a process associated with each groups and/or collection of devices. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process 210 can be a business process, wherein the devices 206 can be indirectly utilized in association with the business process (not shown). In an example, the RFID stack can bridge the gap between devices 206 and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host and/or server associated with the RFID network 204 can utilize a business rules engine (not shown), wherein such business rules engine can provide a rule-based system in association with any application related to the RFID network 204 such that a filter and/or alert can be utilized as a rule(s). The business rules engine can execute declarative filters and/or alerts as rules associated with an RFID network 204, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

The RFID process 210 (also referred to as the process 210) can be an uber and/or high-level object that can provide a meaningful unit of execution. For instance, the process can be a shipping process that represents multiple devices at various dock doors working together to perform tag reads, filtering, read enrichment, alert evaluation, and data storage in a sink for a host application to retrieve/process. In another example, the process 210 can execute a manufacturing process, wherein devices are configured to read as well as write dependent upon a location. Moreover, additional functions such as filtering, alerting, enriching, etc. can be implemented at the location. In yet another example, the process can write to a tag process, wherein a tag can be written in real-time based at least upon an input. The write process can also check if the write succeeded by reading and passing data back to the host.

Figure 3:
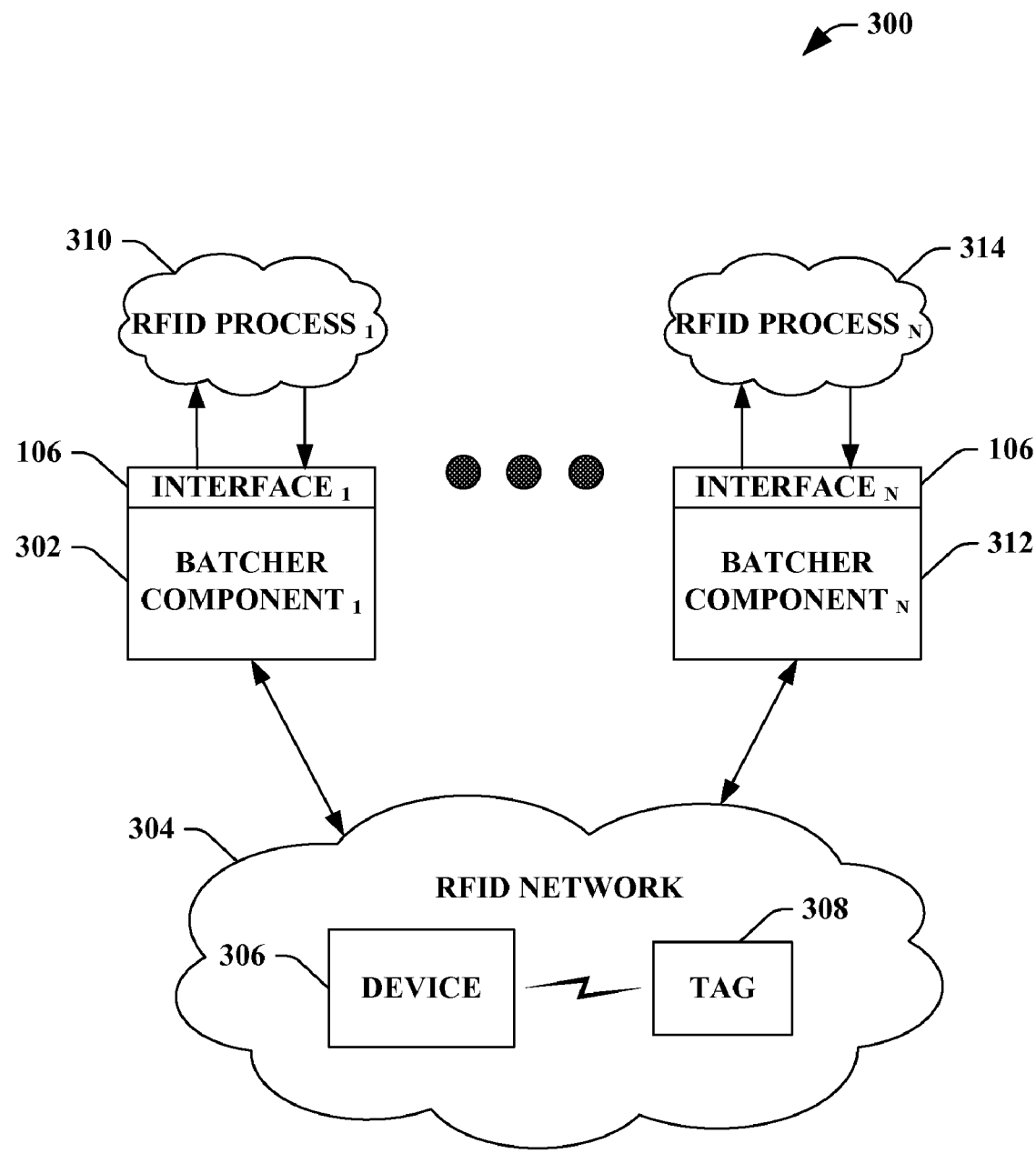
FIG. 3 illustrates a block diagram of an exemplary system that facilitates employing boundary conditions to optimize the receipt of wirelessly communicated data within an RFID network that can be implemented by a plurality of processes.

FIG. 3 illustrates a system 300 that facilitates employing boundary conditions to optimize the receipt of wirelessly communicated data within an RFID network that can be implemented by a plurality of processes. The system 300 can include a $batcher component_1$ 302 that collected data from a device 306 within an RFID network 304, wherein the data can be communicated to an $RFID process_1$ 310 allowing the process to deal with relevant data (e.g., reads, tag reads, events, tag read events, etc.) in an even manner. In other words, the system 300 allows processes to pre-filter, aggregate, transform, and batch data before being handed off to processes.

Thus, the batcher component₁ 302 can buffer between the reads and processes utilizing such reads.

It is to be appreciated that there can be any number of batcher components that provide the collection of data from a device 306 based on a cycle and/or boundary condition. For instance, a batcher component can be deployed for each process such as batcher component₁ 302 for the RFID process₁ 310 (with interface₁) to batcher component$_N$ 312 for the RFID process$_N$ 314 (with interface N), where N is a positive integer. By utilizing a batcher component respective to each process, data can be collected and communicated based at least in part upon the particularities associated with each process. For instance, a shipping process can utilize a batcher component that collects data in a cycle of every 5 minutes, wherein the collected data can be provided to the shipping process in a batch manner. In another instance, a receiving process utilizing the substantially similar RFID network can employ a batcher component that collects data in a disparate cycle (e.g., every hour) and communicates such data to the receiving process in a batch manner.

In another example, there can be event handlers in a process such that declarative conditions can specify events the process and/or deployer are interested. When the process is compiled, the declarative conditions can be extracted out and pushed into a host and/or server, wherein the server and/or host can use such information (e.g., utilizing a query for a relational database). The process can then receive data (e.g., reads, tag reads, tag read events, etc.) from the physical RFID network based on a cycle and/or a start boundary, an end boundary, and/or any combination thereof. In other words, the data can be taken into a dedicated queue within an RFID server and/or host, wherein such data can then be distributed in bulk to the respective and/or interested processes employing low level quantum based solving. Furthermore, the batching conditions can arrive at design time and be tuned at runtime based at least in part upon execution semantics.

In yet another example, the batcher component 302 can ascertain a batching primitive associated with an event processing pipeline related to the RFID process 310 in order to receive relevant batched data (e.g., tag reads, reads, events, etc.). Thus, the batcher component 302 can examine the event processing pipeline to determine batching primitives and apply such primitives to receive relevant batched reads. The claimed subject matter can further implement a declarative design construct (e.g., an extensible markup language (XML) file), allowing the specification of a particular batching primitive for an event processing pipeline. In other words, at design time, a user can specify particular batch characteristics which can be related to the event processing pipeline and utilized by the batcher component 302 to ascertain batched data. Furthermore, the batcher component 302 allows the declarative batcher specification and/or batching primitives to be pushed directly to the device 306 and/or execute it on a server side based on device capabilities (e.g. such as the RFID network 304).

Figure 4:
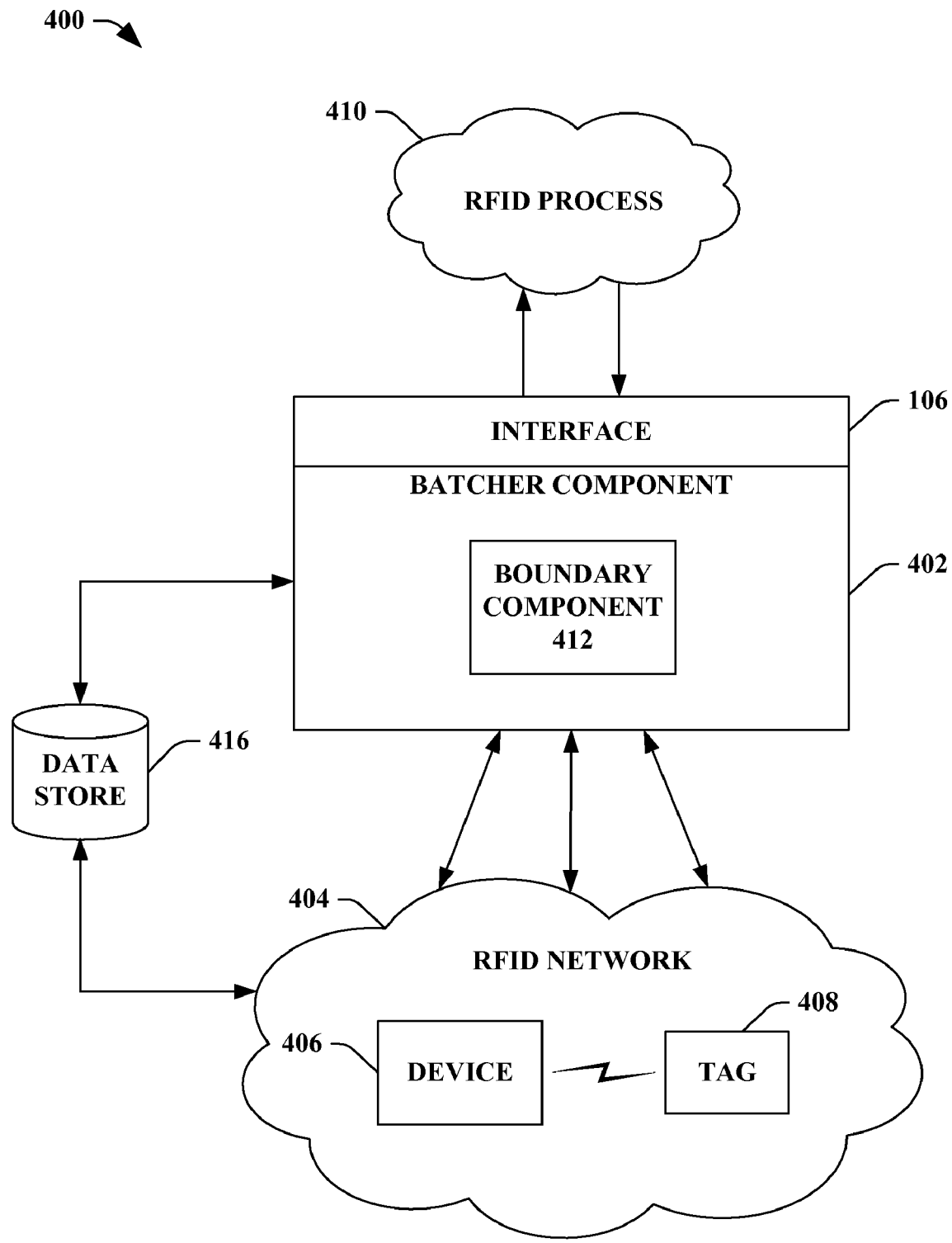
FIG. 4 illustrates a block diagram of an exemplary system that facilitates communicating data from an RFID network to at least one process with a batch technique.

FIG. 4 illustrates a system 400 that facilitates communicating data from an RFID network to at least one process with a batch technique. A batcher component 402 can be included within the system 400 that collects and routes data to an RFID process 410 based upon a cycle and/or a boundary condition. It is to be appreciated that the cycle and/or boundary condition can be any suitable cycle and/or condition which allows data to be collected and communicated to the RFID process 410 in a batch manner. The batcher component 402 can further provide optimization based on the fact that before any data is received and/or routed to the process pipeline associated with the RFID process 410, the unnecessary data can be reduced from the cycle allowing the events to be processed in a more efficient manner. The data can be received from a tag 408 that transmits data to a device 406 within the RFID network 404. It is to be appreciated that the batcher component 402, the RFID network 404, the device 406, the tag 408, and the RFID process 410 can be substantially similar to other components, networks, devices, tags, and processes described in earlier figures.

The batcher component 402 can further provide utilizing a form of query (e.g., SQL, any suitable relational database query, etc.) from the RFID process 410 which can allow the RFID process to receive the appropriate result set as an outcome of the query. For example, during design time, the parameters of a filter, an aggregation, and/or a transform can be specified, wherein such parameters can be compiled into relational queries (e.g. defining the cycle and/or boundary) that the RFID server and/or host can execute on incoming reads, events, tag reads, and/or tag read events allowing the RFID process 410 to receive the incoming batched data. The filter can be a condition that the deployer is interested in, for instance, data wanted and unwanted data. The aggregation can be the manner in which data is to be grouped before routed to the RFID process 410. The transformation can be the information (e.g., metadata) that is to be stamped, written, and/or appended to the events and/or received data before any processing.

The batcher component 402 can include a boundary component 412 that can receive at least one cycle and/or boundary condition in accordance with the compiled RFID process 410, wherein such compilation provides a relational database query such as, but not limited to SQL. In addition, the boundary component 412 can receive previously declared constructs (declared in design time with the process and received after compiling/execution), wherein such declarative constructs can be combined down into a relational database query providing the RFID process 410 with the relevant information. In other words, the relational query can be executed by the boundary component 412, the batcher component 402, and/or any combination thereof. It is to be understood that a cycle can be, for instance, a unit of time, a time, a pre-determined number of reads, tag events, tag read events, and the like. Moreover, the start boundary and/or the end boundary can be based on a unit of time, a time, an amount of data capacity, a pre-determined amount of data, a pre-determined number of reads, a pre-determined number of tag events, a pre-determined number of tag read events, and the like.

The data store 416 can store various data related to the system 400, such as, but not limited to, data received from the device 406, data communicated from the tag 408, a tag read, a tag read event, a read, boundary conditions, process to batch data map settings, etc. For instance, the data store 416 can include any data received from the device 406 and/or transmitted from the tag 408, wherein the batcher component 402 can route such batched data to the requesting process in accordance with a start boundary and an end boundary and/or a cycle. The data store 416 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 416 of the subject systems and methods is intended to comprise, without being limited to, these and any other suitable types of memory and/or storage. In addition, it is to be appreciated that the data store 416 can be a server, a database, a relational database, a hard drive, and the like.

Figure 5:
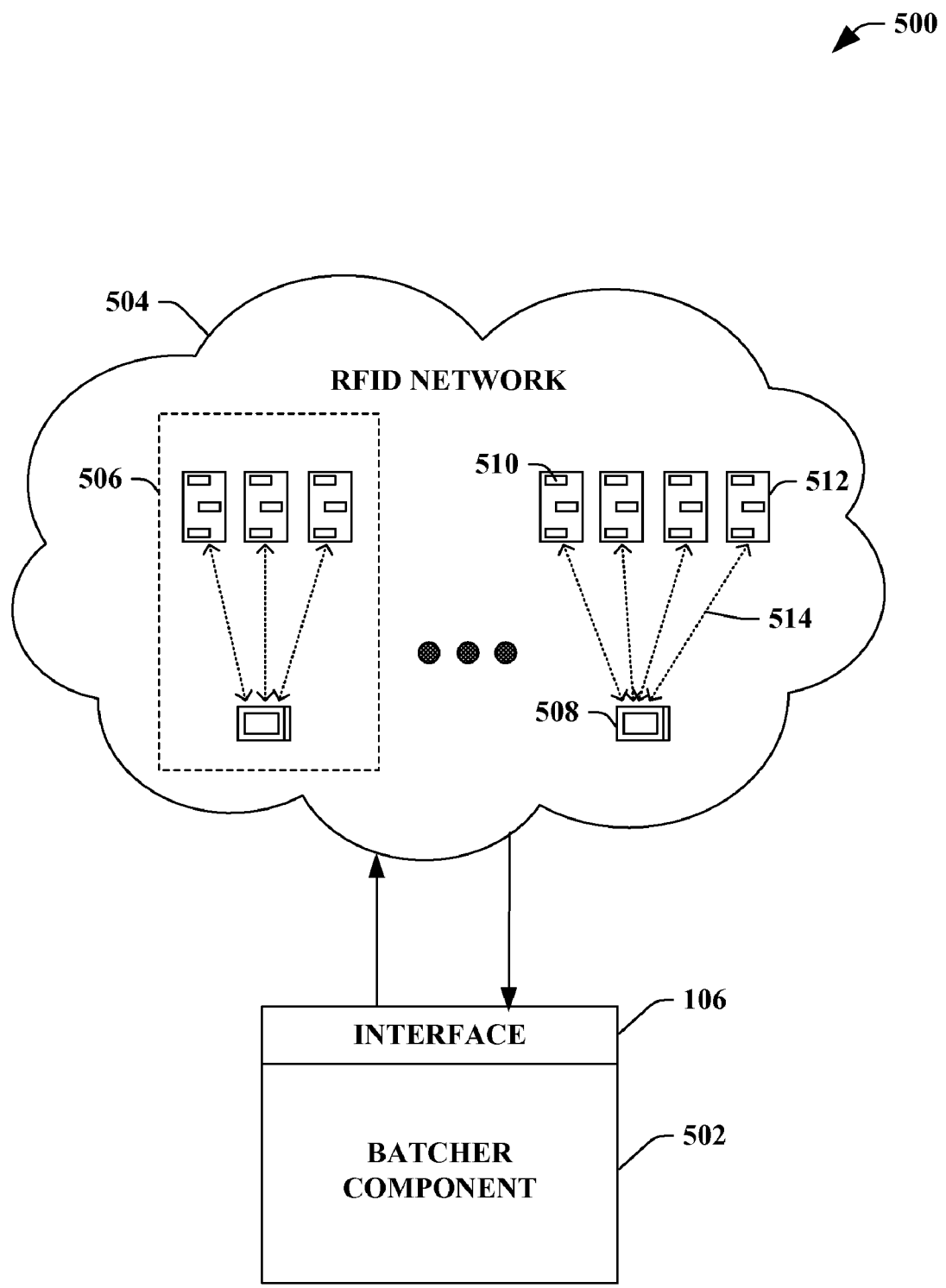
FIG. 5 illustrates a block diagram of an exemplary system that facilitates collecting data from an RFID device within an RFID network.

FIG. 5 illustrates a system 500 that facilitates collecting data from an RFID device within an RFID network. The system 500 can include a batcher component 502 that implements batch collection of data related to an RFID network 504. The batcher component 502 can provide the data collection in a batch manner based upon a cycle and/or a start boundary and an end boundary. Based on the cycle and/or boundaries, the batcher component 502 can collect and communicate the data to an RFID process (not shown) to facilitate conservation of resources. Once received, the RFID process can provide at least one of a filter, an aggregation, and/or a transformation on the batch data by utilizing, for example, an event handler. Furthermore, it is to be appreciated that the batcher component 502 and the RFID network 504 can be substantially similar to previously described figures.

The RFID network 504 can include a plurality of universes (e.g., sub-systems, RFID networks), wherein a universe is a server of RFID entities. For simplicity, the RFID network 504 illustrates a single universe containing two collections of devices (e.g. device collections), where a first collection 506 is shown. It is to be appreciated that the device collections can correspond to device groups as utilized by the batcher component 502, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 506 can be a collection of devices within the specified sub-system. It is to be appreciated a plurality of collection of devices can be implemented. Within a collection of devices, a device 508 can receive an RFID signal 514 from a pallet of goods 512 containing at least one RFID tag 510. It is to be appreciated the pallets and/or goods can be tagged based at least upon user specifications (e.g., single pallets tagged, individual goods tagged, pallets and goods tagged, etc.).

Figure 6:
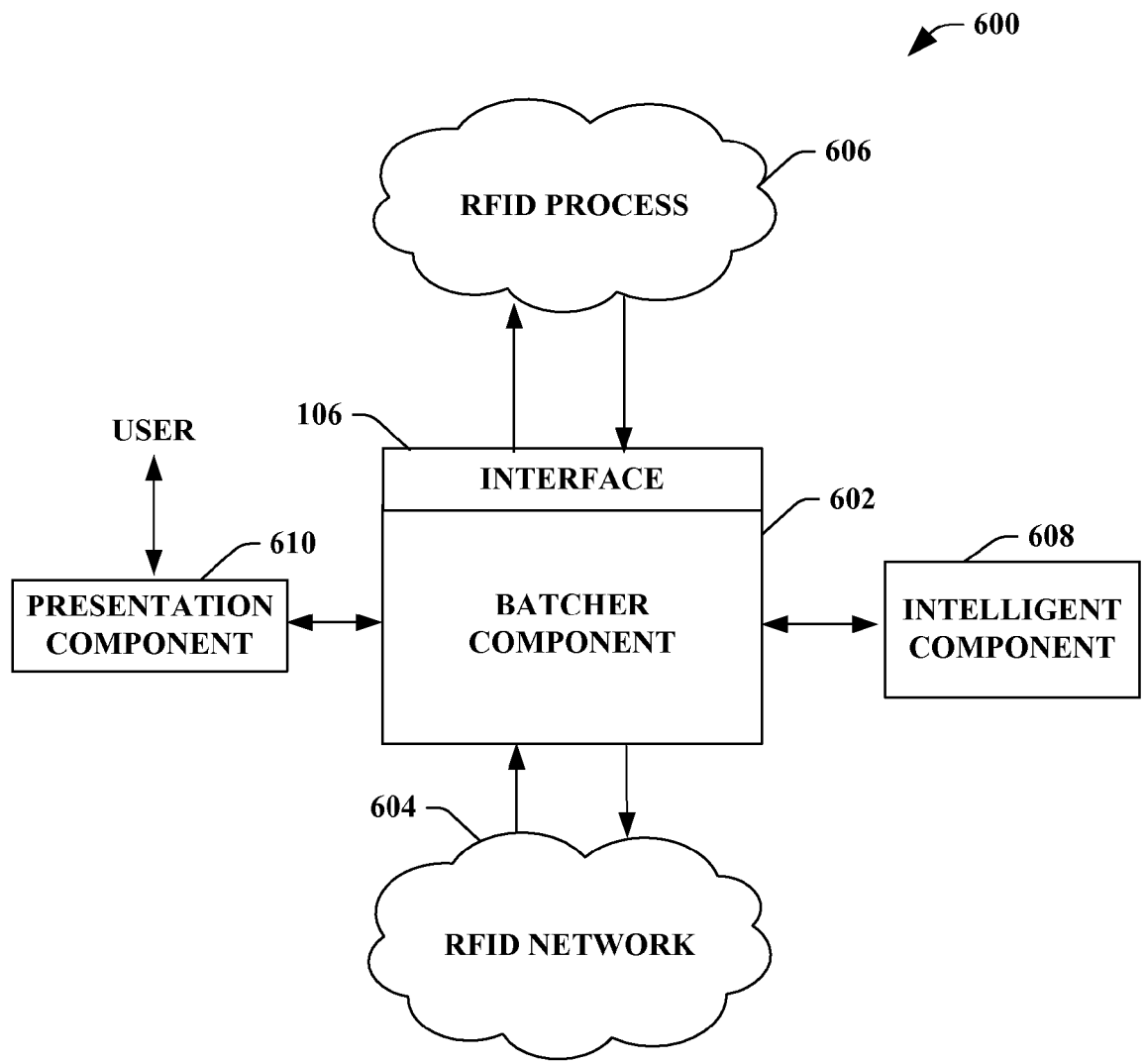
FIG. 6 illustrates a block diagram of an exemplary system that facilitates utilizing wirelessly communicated data from a device within an RFID network in connection with a process.

FIG. 6 illustrates a system 600 that employs intelligence to facilitate utilizing wirelessly communicated data from a device within an RFID network in connection with a process. The system 600 can include a batcher component 602, an RFID network 604, an RFID process 606, and the interface 106 that can all be substantially similar to respective components, networks, processes, and interfaces described in previous figures. The system 600 further includes an intelligent component 608. The intelligent component 608 can be utilized by the batcher component 602 to facilitate receiving and communicating data from the RFID network 604 to the RFID process 606 in a batch manner and/or technique. For example, the intelligent component 608 can infer cycles, start boundaries, end boundaries, filters, aggregations, transformations, which processes receive certain data, queries associated with pushing RFID processes down, etc.

It is to be understood that the intelligent component 608 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The batcher component 602 can further utilize a presentation component 610 that provides various types of user interfaces to facilitate interaction between a user and any component coupled to the batcher component 602. As depicted, the presentation component 610 is a separate entity that can be utilized with the batcher component 602. However, it is to be appreciated that the presentation component 610 and/or similar view components can be incorporated into the batcher component 602 and/or a stand-alone unit. The presentation component 610 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the batcher component 602.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
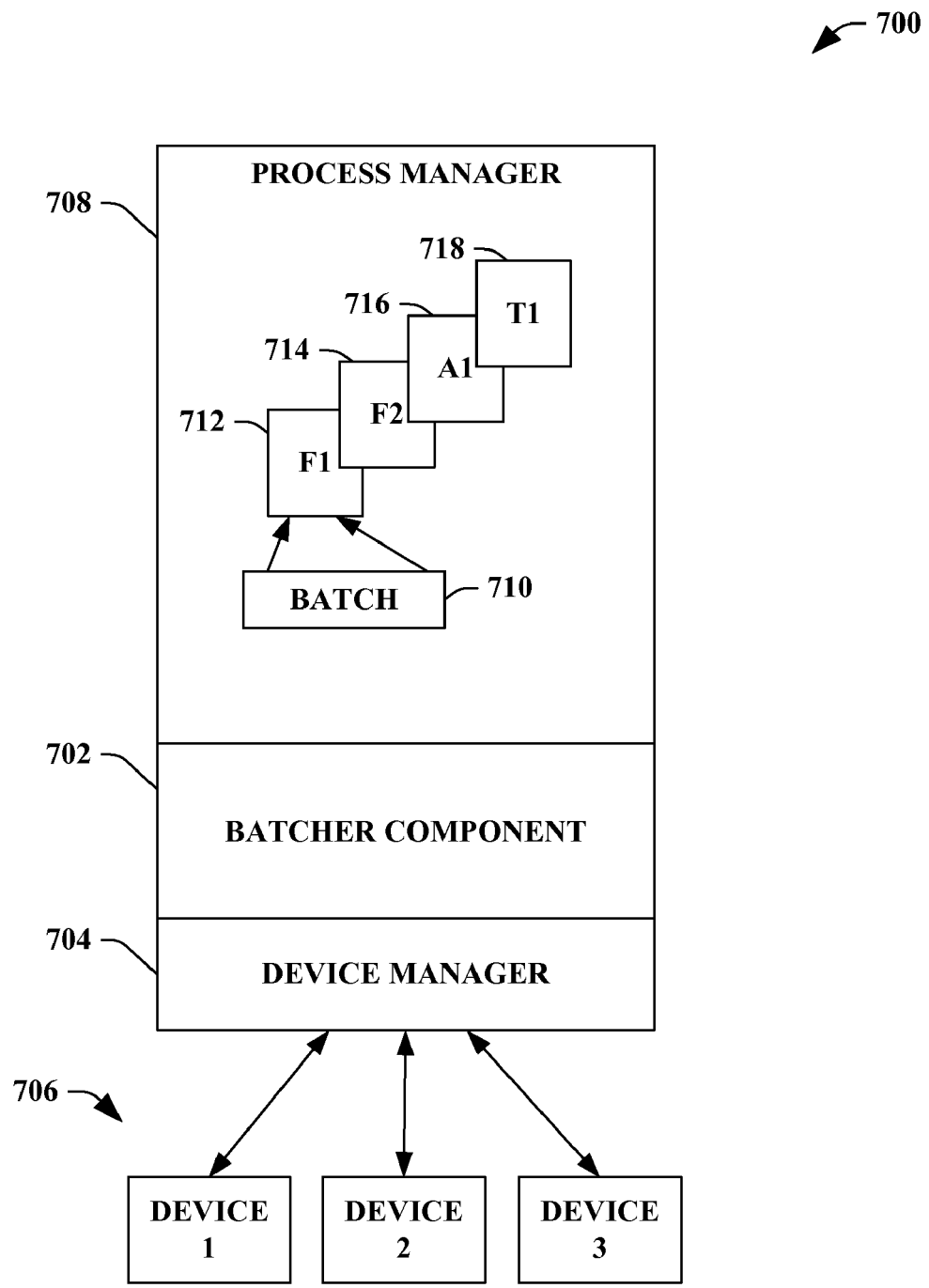
FIG. 7 illustrates a block diagram of an exemplary system that facilitates providing an RFID process with data in utilizing a first boundary condition and a second boundary condition.

FIG. 7 illustrates a system 700 that facilitates providing an RFID process with data in utilizing a first boundary condition and a second boundary condition. The system 700 provides the ability to reduce some filter, aggregation, or transformation-based business process based on a batch 710 of tag reads in a declarative manner without writing any code. The system 700 enhances productivity, improves the ability to debug, and improves the reliability of an RFID process. The system 700 can include a batcher component 702 that collects data in a batch manner and routes such collected data to a process manager 708, wherein such data is collected by a plurality of devices 706 managed by a device manager 704. It is to be appreciated that the batcher component 702 can be substantially similar to the batcher component described in earlier figures.

The RFID process can map to a business process in the real world and can contain logical sources (e.g., which can be recursive). The base level logical source can specify the following: the RFID devices whose tags it is interested in processing (e.g., it wants to process tags from the front door devices); and one or more of a FAT (filter, aggregation, transformation) batch. The FAT batch can include at least one of the following: a boundary condition that specifies when the batch starts and ends (e.g., a batch starts at the start of every hour and ends at the end of the hour); and the FATs (filters, aggregations, and transformations) that are to be applied on the batch defined by the boundaries specified above.

For example, an overview of the claimed subject matter can be as follows. It is to be appreciated that the following is an example and is not to be limiting on the subject innovation. The tags from the plurality of devices 706 of interest (e.g., device 1, device 2, and device 3) can be routed into a dedicated queue for the RFID process (not shown). For each FAT batch, the following can be employed: 1) when the batch boundary conditions are met, the set of events satisfying the batch rules for the process are taken up for processing; 2) the processing is done by folding a declaratively declared filter 712 (referred to as F1) and a declaratively declared filter 714 (referred to as F14), an aggregation 716 (referred to as A1), and a transformation 718 (referred to as T1) into a relational database query (e.g., SQL) and executing it on the batch of events that are defined by the batch boundary conditions; and 3) keep a separate track of the output of the filters and transformations (e.g., referred to as set1), and the aggregations that are executed on set1 (e.g., referred to as set2).

The following is an example of a business scenario and how a FAT batch would work therefore; it is to be appreciated and understood that the following is only for exemplary purposes and the subject innovation is not so limited. The business process can be for a garment factory as defined below:

---
FATBatch1:

Batch:
    Starting boundary condition: $1^{st}$ second past the hour,
    ending condition: last second of the hour.
FATs:
    Filters:
        F1 = blue garments
        F2 = coats
    Aggregates:
        A1 = Number of garments of interest in the
        entire batch (e.g., for the entire hour).
        A2 = Number of garments of interest aggregated
        by minute.
        A3 = Number of garments aggregated by size
        (e.g., how many smalls, how many mediums,
        how many large, etc.).
    Transformations:
        T1 = For every garment of interest, mark it as
        "Received" in the database.

---

The batcher component 702 can implement the above by triggering the execution of a relational database query (e.g., SQL) at the end of the hour, which can be illustrated by the following:

```
Select *
Into FATBatch1Table
from
    (select *
    from SSB_Table
    where TagTime.Hour = DATEPART(month, GETDATE( ))
    ), MyDatabase.DataTable
Where
    Color = 'blue' AND
    GarmentType = 'Coats
```

The transformation can be achieved by updating FATBatch1Table as depicted by the following:

```
UPDATE FATBatch1Table
Set Tag.Data = Tag.Data + 'Received'--concatenate the string 'Receive'
with the existing data.
```

Each aggregation can result in another set as a side effect. For instance, A3 can be implemented as the following:

```
        SELECT
            GarmentSize, count(*)
        from
            FATBatch1Table
        Group by
            GarmentSize
```

The above queries can typically be done after joining with some external table which has information about which tag identification (e.g., tagid) corresponds to which garment type, color, etc. Furthermore, the output of the logical source can be FATBatch1Table. The sets generated by the aggregations can be thought of as a "side effect" of the logical source, which may not be used for further processing with future logical sources (e.g., LogicalSources).

Figure 8:
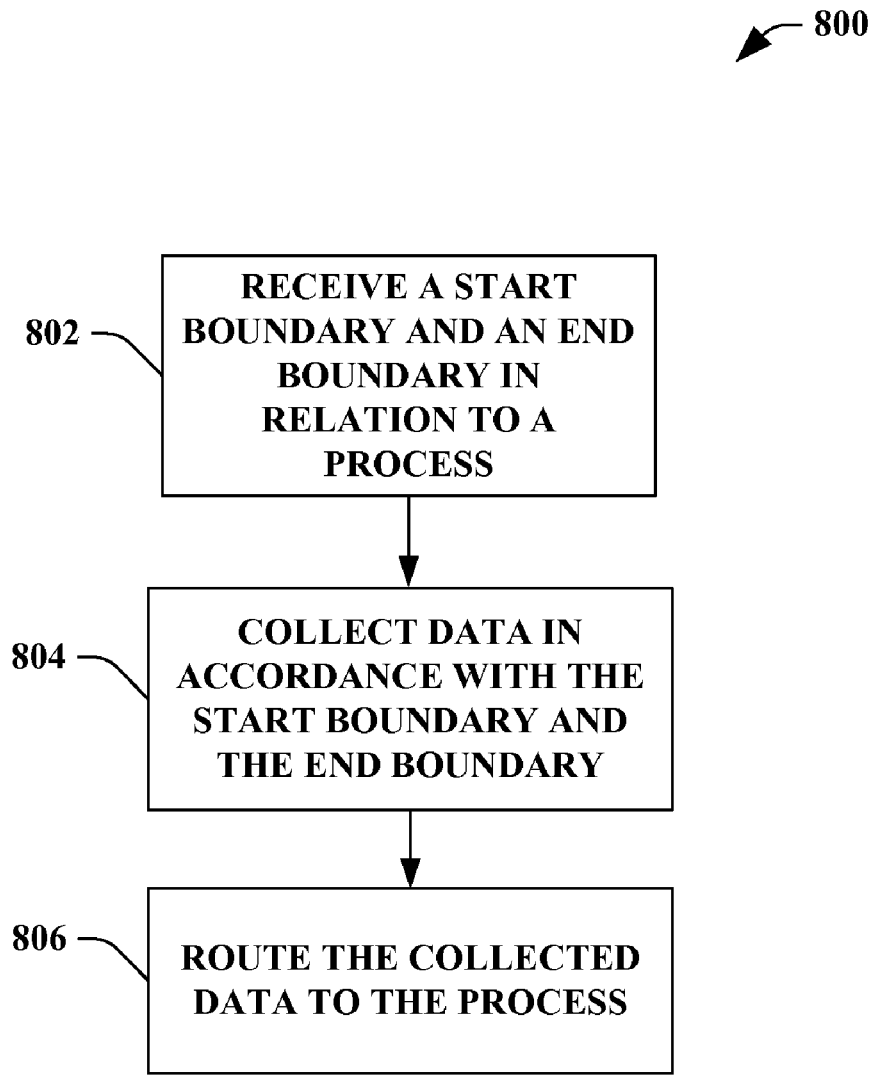
FIG. 8 illustrates an exemplary methodology for providing wirelessly communicated data to a process in a batch form.
Figure 9:
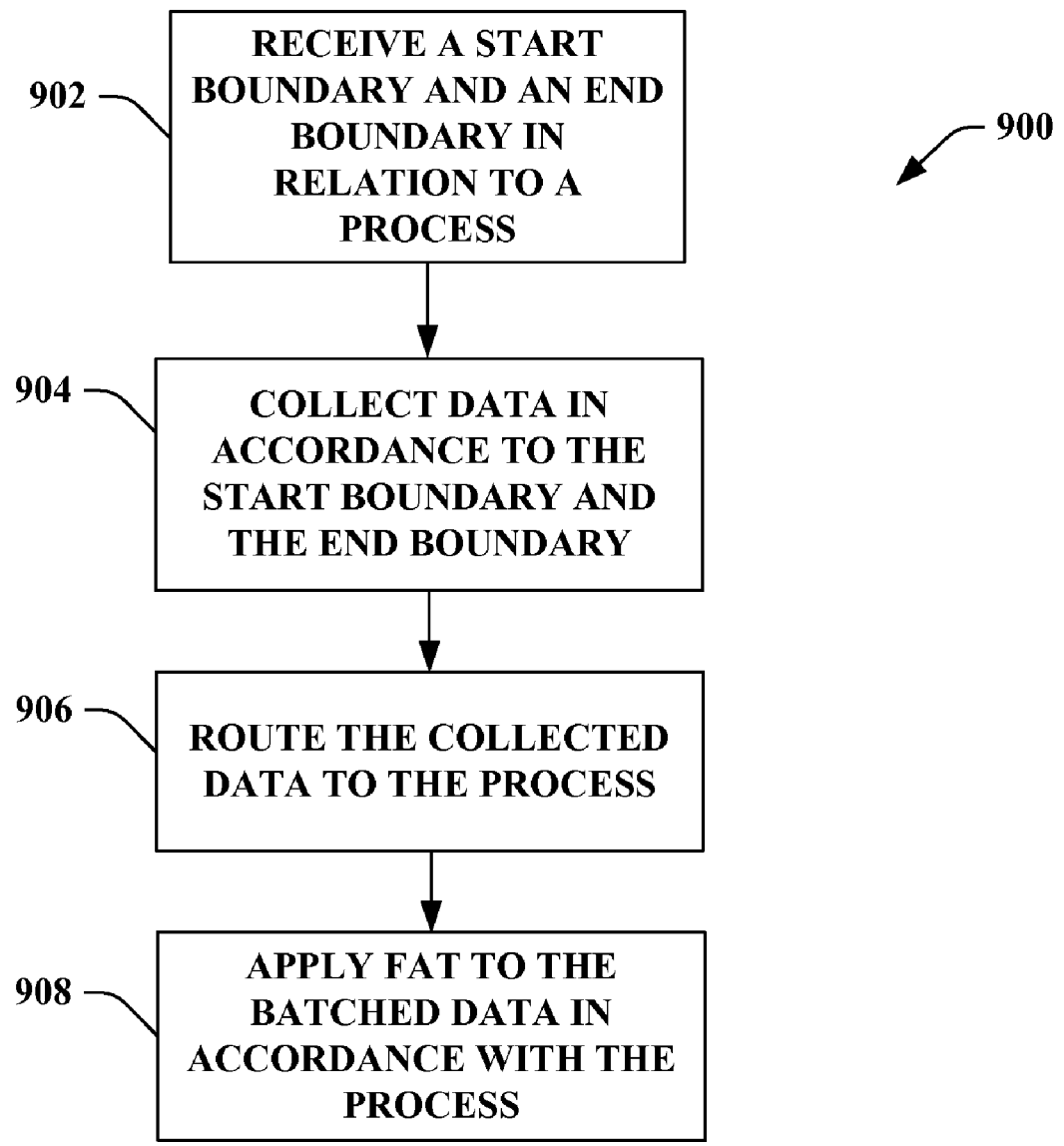
FIG. 9 illustrates an exemplary methodology that facilitates providing filtering, aggregation, and/or transformations to data based on a first boundary and a second boundary.
Figure 10:
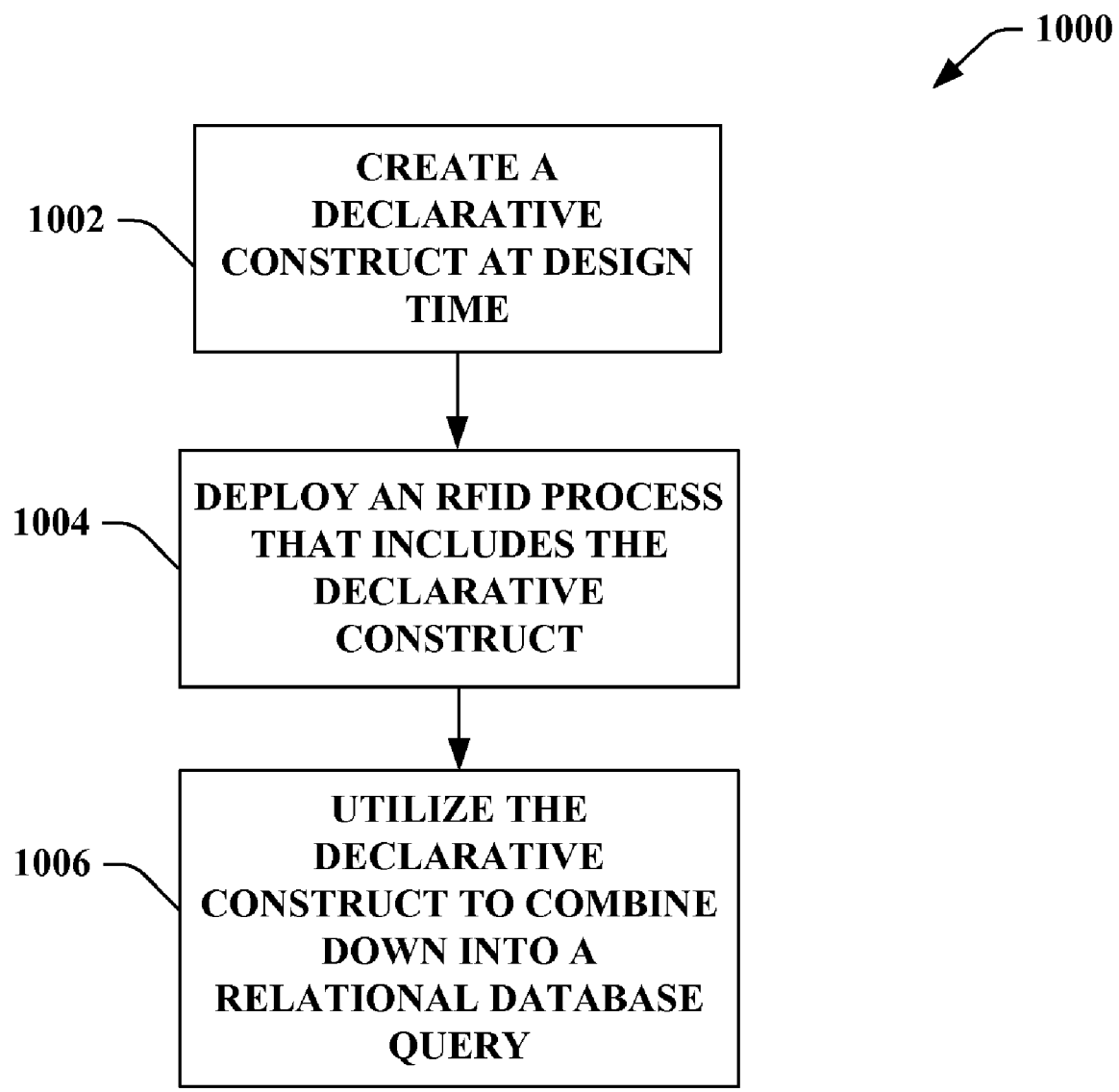
FIG. 10 illustrates an exemplary methodology for employing a query related to an RFID process to provide data in a batch form.

FIGS. 8-10 illustrate methodologies in accordance with the claimed subject matter. For simplicity of explanation, the methodologies are depicted and described as a series of acts.

It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates providing wirelessly communicated data to a process in a batch form. At reference numeral 802, a start boundary and an end boundary can be created, received, and/or provided, wherein the boundaries relate to a process. The start boundary and the end boundary can be utilized as to allow a cycle and/or a unit of time for the process to receive data. For instance, the cycle can be, but not limited to, a unit of time, a time, a pre-determined number of reads, a pre-determined number of tag events, a pre-determined number of tag read events, and the like. Moreover, the start boundary and/or the end boundary can be based on a unit of time, a time, an amount of data capacity, a pre-determined amount of data, a pre-determined number of reads, a pre-determined number of tag events, a pre-determined number of tag read events, and the like. In one example, the start boundary can be at the beginning of every hour and the end boundary can be the end of every hour.

It is to be appreciated that the data can be any wirelessly transmitted data associated with a tag and a device. The device can receive a signal from, for instance, at least one tag and/or a plurality of tags. In one example, the tag can contain an antenna that provides reception and/or transmission to radio frequency queries from the device. Furthermore, it is to be appreciated that the device within the RFID network can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Moreover, the device can relate to an RFID network. The RFID network can include at least one device that is associated with at least one RFID process. It is to be appreciated that the RFID process can utilize any suitable number of devices within the RFID network. An RFID process can be related to a particular RFID sub-system (e.g., an RFID server, RFID network, etc.) that is an uber or high-level object that forms together various entities to create a meaningful unit of execution. The RFID process can be an outbound process (e.g., pick, pack, shipping scenario, etc.), a manufacturing process, a shipping process, a receiving process, tracking, data representation, data manipulation, data application, security, etc.

At reference numeral 804, data can be collected in accordance to the start boundary and the end boundary. Thus, the data can be buffered and/or held onto while the boundary conditions are met. Following the example above, the data can be collected for an hour in order to satisfy the boundary conditions. By waiting for the boundary conditions to be met, the data can be batched in order to optimize processing and/or other resources. At reference numeral 806, the data collected can be routed and/or communicated to the respective process for which the boundary conditions relate. In other words, the process can receive data in a batch manner rather than in a constant and consecutive manner that can reduce processing efficiency.

FIG. 9 illustrates a methodology 900 for providing filtering, aggregation, and/or transformations to data based on a first boundary and a second boundary. At reference numeral 902, a start boundary and an end boundary related to a process can be received, created, provided, defined, and/or pushed down from the process. The start boundary and the end boundary can define a cycle, wherein such cycle can enhance optimization of the processing associated with the process and/or application. For example, the cycle and/or boundary conditions can be a unit of time, a duration of time, a time, a pre-determined number of reads, a pre-determined number of tag events, a pre-determined number of tag read events, an amount of data capacity, a pre-determined amount of data, and the like. Moreover, boundaries can be defined by a batching primitive associated with an event processing pipeline in order to receive relevant batched data (e.g., tag reads, reads, events, etc.). For instance, the event processing pipeline can be examined to determine batching primitives.

The data can be received from a device within an RFID network. It is to be appreciated that the devices can be at least one of the following: an RFID reader, an RFID writer, an RFID printer, a printer, a reader, a writer, an RFID transmitter, an antenna, a sensor, a real-time device, an RFID receiver, a real-time sensor, a device extensible to a web service, a real-time event generation, etc. The RFID network can be implemented by any enterprise, business, facility, and/or any suitable entity that can utilize RFID technology. For instance, the RFID network can be deployed to include any number of devices such as $device_1$ to $device_N$, where N is positive integer. Moreover, such devices can interact (e.g., wirelessly communicate) with any number of tags such as $tag_1$ to $tag_M$, where M is a positive integer.

At reference numeral 904, data can be collected in accordance to the cycle and/or start boundary condition and the end boundary condition. In one example, the data can be routed to a dedicated queue, data store, database, and the like to await satisfaction of the boundary conditions. In other words, the data can be held onto until the end boundary and/or cycle is reached. In another example, a declarative design construct (e.g., an extensible markup language (XML) file), can allow a specification of a particular batching primitive for an event processing pipeline. In other words, at design time, a user can specify particular batch characteristics which can be related to the event processing pipeline and utilized to ascertain batched data. At reference numeral 906, the collected data can be routed and/or communicated to the process. The data collected in a batch manner and/or technique can be transmitted to the respective process that defined the boundary conditions. Following the example above, the declarative batcher specification and/or batching primitives can be pushed directly to the device and/or execute it on a server side based on device capabilities (e.g., such as the RFID network).

At reference numeral 908, the batched data can have a filter, an aggregation, and/or a transform applied thereto in accordance with the process. The filter can be a condition that the deployer is interested in, for instance, data wanted and unwanted data. The aggregation can be the manner in which data is to be grouped before routed to the process. The transformation can be the information (e.g., metadata) that is to be stamped, written, and/or appended to the events and/or received data before any processing. For example, during design time, the parameters of a filter, an aggregation, and/or a transform can be specified, wherein such parameters can be compiled into relational queries (e.g. defining the cycle and/or boundary) that the RFID server and/or host can execute on incoming reads, events, tag reads, and/or tag read events allowing the RFID process to receive the incoming batched data.

FIG. 10 illustrates a methodology that facilitates employing a query related to an RFID process to provide data in a batch form. At reference numeral 1002, a declarative construct can be created at design time. For instance, the declarative conditions can specify the events the deployer of a process is interested. The declarative constructs can define a boundary condition and/or cycle for which the process is to receive data. It is to be appreciated that any suitable declarative construct can be created at design time, wherein such declarative construct allows a batch receipt of data when applying FAT without writing any code.

At reference numeral 1004, an RFID process can be deployed that includes the declarative construct. It is to be appreciated that the RFID process can utilize any suitable number of devices within an RFID network. The RFID process can be related to a particular RFID sub-system (e.g., an RFID server, RFID network, etc.) that is an uber or high-level object that forms together various entities to create a meaningful unit of execution. The RFID process can be and/or can include an outbound process (e.g., pick, pack, shipping scenario, etc.), a manufacturing process, a shipping process, a receiving process, tracking, data representation, data manipulation, data application, security, etc. Additionally, the RFID process can include and/or respond to a device service, a tag read, an event, a tag write, a device configuration, a geographic tracking, a number count, etc. It is to be appreciated that the process can have raw data collected via at least one device associated with the RFID network, wherein such raw data can be manipulated based at least in part upon a rule and/or a business rule engine (not shown).

Continuing at reference numeral 1006, the declarative construct can be utilized to combine down into a relational database query to provide appropriate results and/or data to the process. In other words, the declarative constructs can be compiled into relational queries (e.g. SQL) that the server and/or host can execute on incoming events and/or received data, wherein the declarative constructs provide only selected data based on the boundaries and/or cycles within the constructs. Thus, by utilizing a relational database query, the process can receive data in a batch manner and/or technique.

Figure 11:
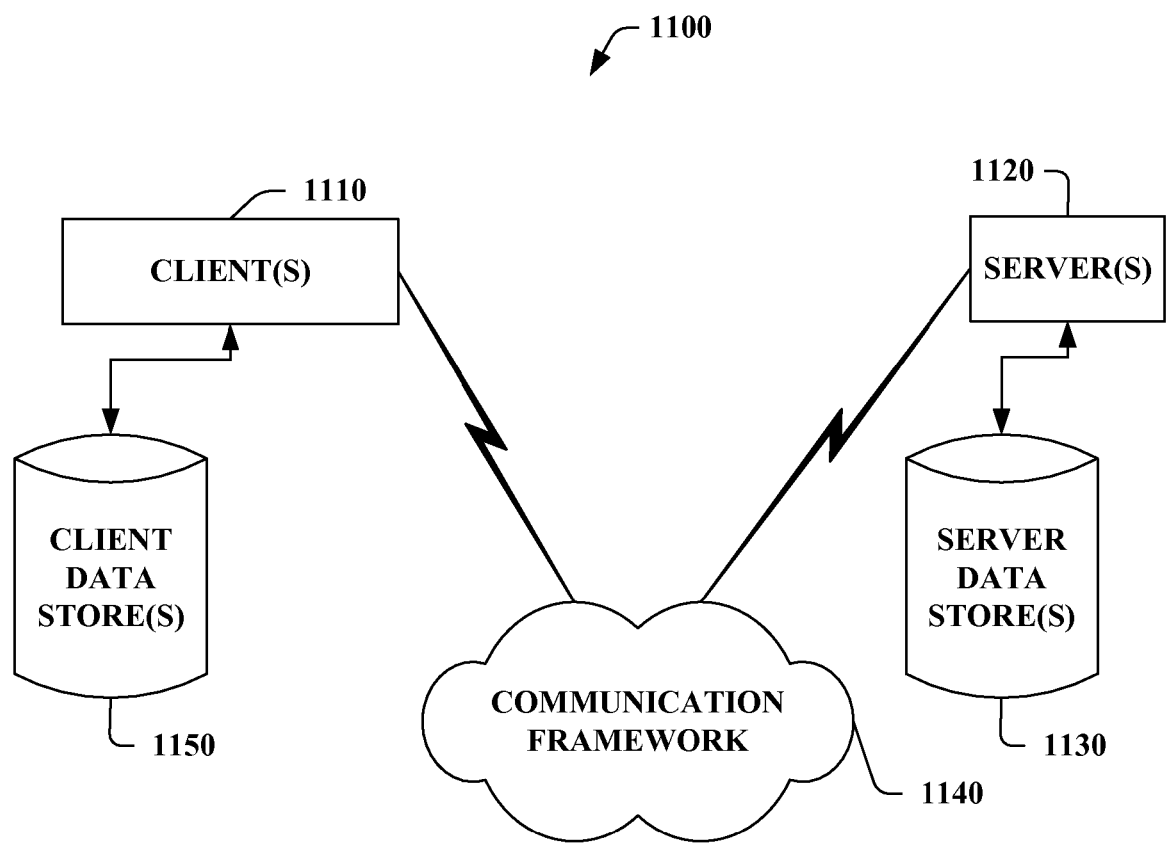
FIG. 11 illustrates an exemplary networking environment, wherein the novel aspects of the claimed subject matter can be employed.
Figure 12:
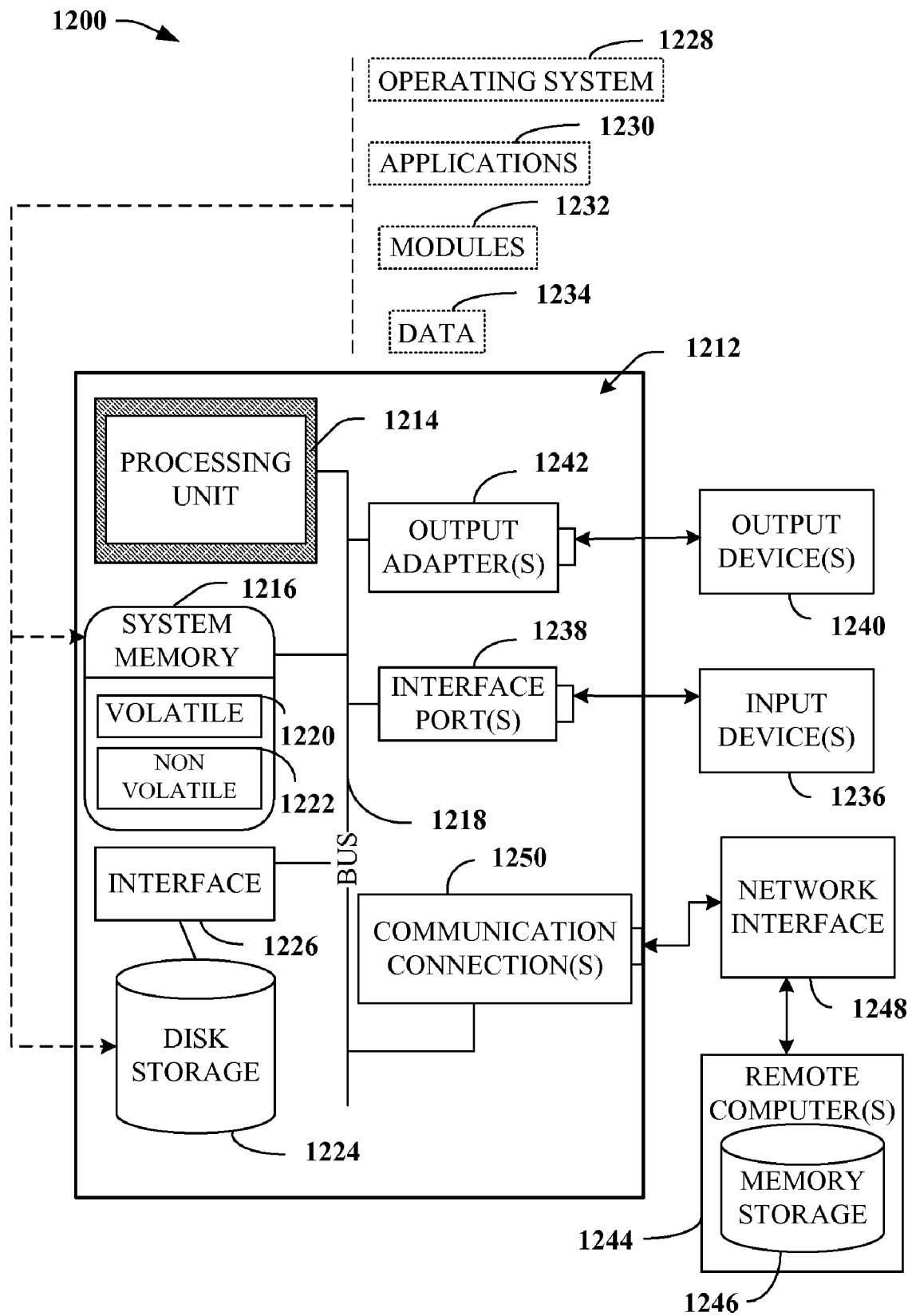
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, a binding component that provides receipt of data in a batch technique from an RFID network, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system configured to facilitate receiving data from at least one device, the system comprising:
  a radio frequency identification (RFID) network that includes at least one device configured to receive data from a tag; and
  a batcher component configured to:
  collect at least a subset of the data from the at least one device from a start boundary to an end boundary defined by the batcher component;
  transform the subset of the data, including appending metadata to the subset of the data prior to processing the subset of the data, the metadata being indicative of one or more parameters for processing a filtered subset of the data, and being defined at during design time the metadata is and compiled into one or more relational queries defining the start boundary and the end boundary at least one boundary condition that an RFID server executes on incoming reads;
  receive the at least one boundary condition in accordance with a compiled RFID process, wherein the compiled RFID process provides a relational database query; and communicate the subset of the data and the metadata to an RFID process.

2. The system of claim 1, wherein the RFID process is a high-level object configured to form at least one entity to create a unit of execution that relates to at least one of the following: an outbound process; a manufacturing process; a shipping process; a receiving process; a tracking process; a data representation process; a data manipulation process; a security process; or a process utilizing at least one of an RFID device service, a device collection, a tag read, an event, an event queue, a tag write, a device configuration or a number count.

3. The system of claim 1, wherein the at least one device is one of the following: an RFID reader; an RFID writer; an RFID printer; a reader; a writer; an RFID transmitter; an antenna; a sensor; a real-time device; an RFID receiver; a real-time sensor; a device extensible to a web service; or a real-time event generation system.

4. The system of claim 1, wherein the start boundary is at least one of a unit of time, a time, a duration of time, a pre-determined number of reads, an amount of data capacity or a pre-determined amount of data.

5. The system of claim 1, wherein the end boundary is at least one of a unit of time, a time, a duration of time, a pre-determined number of reads, a pre-determined number of tag events, a pre-determined number of tag read events, an amount of data capacity or a pre-determined amount of data.

6. The system of claim 1, wherein the subset of the data is one of the following: a read from the tag, a tag event, a tag read event or data transmitted from a tag.

7. The system of claim 1, wherein the batcher component is configured to collect the subset of the data for a plurality of start boundaries and a plurality of end boundaries and communicate a plurality of the subset of the data to the RFID process.

8. The system of claim 1, further comprising a dedicated queue that includes the subset of the data received from the at least one device until boundary conditions are met.

9. The system of claim 1, further comprising a design-time-provided declarative construct that, upon being deployed, can be combined into a relational database query, wherein the relational database query is a sequential query language (SQL).

10. The system of claim 1, further comprising at least one of the following: the batcher component being further configured to examine an event processing pipeline to ascertain batching primitives to receive relevant batched data; or a declarative construct configured to specify the batching primitive on an event processing pipeline.

11. The system of claim 1, wherein the batcher component further comprises a boundary component configured to:
receive at least one of a cycle or a boundary condition in accordance with a compiled RFID process; and
generate a relational database query configured to cause the batcher component to provide the compiled RFID process with appropriate batched data collected by the batcher component.

12. The system of claim 1, wherein the batcher component is further configured to push a declarative construct to at least one of the at least one device or a server side based, at least, on capabilities of the at least one device.

13. The system of claim 1, wherein the subset of the data at the batcher component is configured to be processed by integrating a declaratively declared construct into a query and executing the construct on the subset of the data.

14. The system of claim 13, wherein the declaratively declared construct is at least one of the following: a filter that is a condition of interest to a deployer; or an aggregation that is a grouping of the subset of the data prior to routing to the RFID process.

15. The system of claim 1, further comprising a presentation component configured to provide at least one user interface configured to facilitate interaction between a user and the batcher component.

16. The system of claim 1, wherein the RFID network comprises a collection of devices that form a sub-system that includes:
an RFID reader configured to receive an RFID signal; and
an RFID tag configured to transmit to at least one device.

17. A computer-implemented method that facilitates providing data to a radio frequency identification (RFID) process, the computer-implemented method comprising:
receiving a start boundary and an end boundary associated with the RFID process;
batching data read from an RFID tag, the batching being performed by a batcher component and from the start boundary to the end boundary, and the data being read by an RFID device;
performing a transformation on batched data, the performing the transformation comprising adding metadata to the batched data prior to processing the batched data, the metadata being indicative of one or more parameters for processing filtered batched data, and being defined at during design time the metadata is and compiled into one or more relational queries defining the start boundary and the end boundary at least one boundary condition that an RFID server executes on incoming reads;
receiving the at least one boundary condition in accordance with a compiled RFID process, wherein the compiled RFID process provides a relational database query; and
routing the batched data to the RFID process.

18. The method of claim 17, further comprising applying at least one of a filter or an aggregation to the batched data, the applying the at least one of the filter or the aggregation being in accordance with the RFID process.

19. The method of claim 17, further comprising:
utilizing a declarative construct to generate a relational database query, the declarative construct being created at design time and is associated with the RFID process.

20. A non-transitory computer-readable storage media storing computer-executable instructions that, when executed by a computing device, cause the computing device to perform operations comprising:
receiving a start boundary and an end boundary associated with the RFID process;
batching data read from an RFID tag, the batching being performed by a batcher component and from the start boundary to the end boundary, and the data being read by an RFID device;
performing a transformation on batched data, the performing the transformation comprising adding metadata to the batched data prior to processing the batched data, the metadata being indicative of one or more parameters for processing filtered batched data, and being defined at during design time the metadata is and compiled into one or more relational queries defining the start boundary and the end boundary at least one boundary condition that an RFID server executes on incoming reads;
receive the at least one boundary condition in accordance with a compiled RFID process, wherein the compiled RFID process provides a relational database query; and
routing the batched data to the RFID process.

* * * * *